Nov. 1, 1927.  1,647,166
E. WILDHABER
GEAR
Filed Dec. 7, 1925  2 Sheets-Sheet 1

Ernest Wildhaber
INVENTOR

ATTORNEY

Nov. 1, 1927.　　　　　　　　　　　　　　　　　　　　1,647,166
E. WILDHABER
GEAR
Filed Dec. 7, 1925　　　　　　　2 Sheets-Sheet 2

Ernest Wildhaber INVENTOR

ATTORNEY

Patented Nov. 1, 1927.

1,647,166

UNITED STATES PATENT OFFICE.

ERNEST WILDHABER, OF ROCHESTER, NEW YORK, ASSIGNOR TO GLEASON WORKS, OF ROCHESTER, NEW YORK, A CORPORATION OF NEW YORK.

GEAR.

Application filed December 7, 1925. Serial No. 73,721.

The present invention relates to gears and to a method for producing the same and particularly to hypoid gears and to a method for producing such gears.

The primary object of this invention is to provide an improved construction for hypoid gears and an improved method of producing such gears, whereby the known advantages of hypoid gears may be combined in a structure which will be practical in operation.

Other objects of the invention will be apparent in the course of the specification and from the recitation of the appended claims.

One embodiment of this invention is illustrated in the accompanying drawings. It will be understood, however, that the invention is not limited to the particular embodiment shown, but is capable of further modification within its scope and the limits of the claims.

Figure 2:
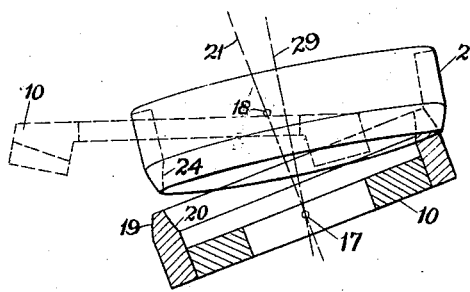
Fig. 2 is a view illustrating diagrammatically the relation between the tool employed for cutting the gear and the tool employed for cutting the mating pinion.
Figure 1:
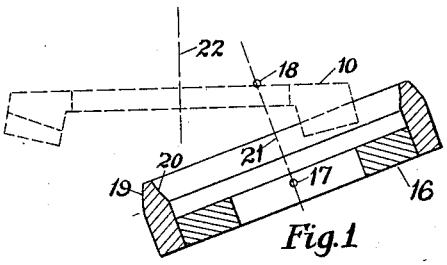
Fig. 1 is a view illustrating diagrammatically the method for producing a gear constructed according to this invention.
Figure 3:
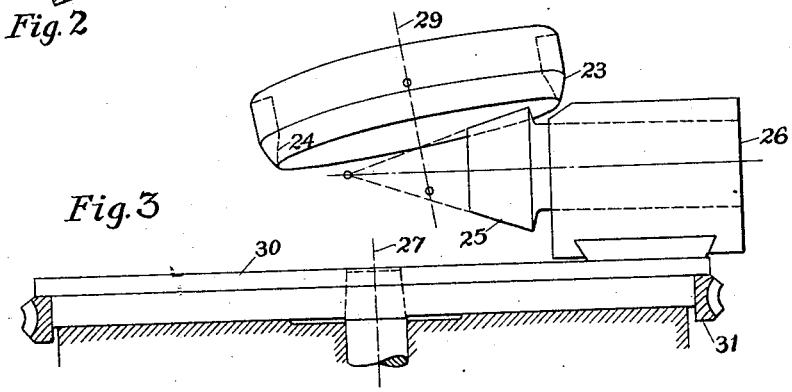
Figs. 3 and 4 are a diagrammatic side elevation and bottom plan view, respectively, illustrating the method of producing the pinion.
Figure 4:
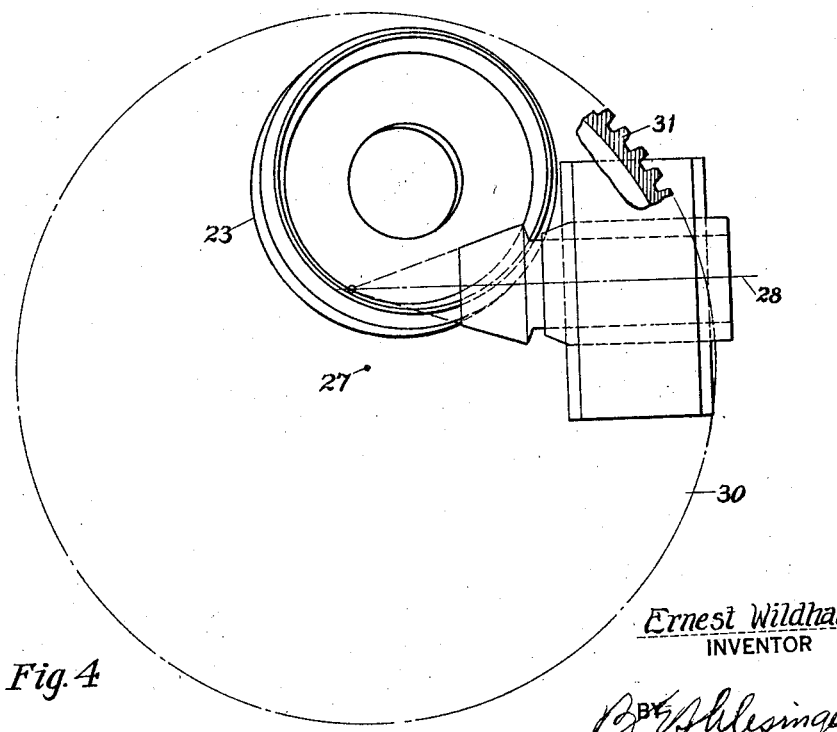

Hypoid or hyperboloidal gears are gears which are adapted to mesh with their axes non-intersecting and non-parallel and in which at least one member of the pair is provided with teeth on a side face. A bevel gear drive is restricted in its use to transmitting motion between shafts which have intersecting axes. A hypoid drive, on the other hand, may be used where the shafts are offset one from another. Hypoid gears, therefore, have many possible uses in all fields of machinery and in various drives. In particular these gears are suited for the final drives of motor vehicles where they permit an offsetting of the propeller shaft from the axle, with a consequent lowering of the center of gravity of the whole vehicle.

Hypoid gears mesh with a combined rolling and sliding action. This meshing action as contrasted with the pure rolling action of bevel gears which tends to squeeze the oil film away from the contacting surfaces, tends to distribute the oil film evenly over the whole contacting tooth surfaces, so that in addition to their advantage in transmitting motion between offset shafts they have the added advantage of meshing with a motion that tends to prolong the life of the gears and to preserve, throughout their life, the desired tooth surface contour.

These and other inherent virtues of hypoid gears have long been recognized, but through failure to devise a suitable construction for such gears and a practical method of producing the same, hypoid gears have never come into general use.

Hypoid gears, as already stated, mesh with a combined rolling and sliding contact. This requires, in the practical construction of such gears, a matching of the tooth surfaces of the pair along their entire length. Such gears must, therefore, be constructed with greater accuracy than the teeth of gears, such as bevel gears, which mesh, only, with rolling contact. In their preferred form both members of a pair of hypoid gears will be made from conical blanks. The requisite tooth strength can only be secured in such gears by cutting their teeth tapering in depth i. e., with the height decreasing toward their respective apexes. The analysis of the mesh and the calculation of the proportions of hypoid gears is very difficult, because, due to their offset axes, the pitch surfaces of such gears, properly considered are not conical but hyperboloidal. In producing such gears, therefore, it is particularly important to devise a theoretically accurate method of manufacture and to follow such method—so far as possible without approximations. I have already determined, as pointed out in my copending application—Serial No. 29,552—filed May 11, 1925, that a desirable tooth contact can be attained in a pair of hypoid gears where the tooth surfaces of one member are surfaces of revolution and the tooth surfaces of the other member are generated conjugate to those of the mate gear. Such gears can be cut with teeth of tapering depth, with theoretical accuracy and without approximation, by using a tool of spherical profile. I, therefore, propose to manufacture hypoid gears by a method in which one member of a pair is produced by moving a spherical tool in a curved path across the face of a stationary gear blank and in which the teeth of the other member are generated conjugate to those of the first gear. The spherical profile of the tool and the longitudinal curvature of the cut, particularly where such curvature is on the arc of a circle, are characteristics which combine, moreover, to permit of great facility in the matching of contacting tooth surfaces, whereby the proper tooth contact, so essential for proper rolling and sliding mesh, can readily be secured.

In a pair of curved tooth hyperboloidal gears, the gear or wheel will have preferably a much smaller spiral angle than the corresponding member of a pair of curved tooth bevel gears, while the pinion will have approximately the same or a larger spiral angle than a corresponding bevel pinion. In such a pair of gears, moreover, the taper of the teeth of both gear and pinion will, preferably, be made dependent on the lengthwise curvature of the teeth, whereas in a pair of curved tooth bevel gears, the taper of the teeth is entirely independent of the cutter radius. I have found that these features of hypoid construction can readily be attained with the present invention. The present invention, hence, permits of the production of hypoid gears of tapering depth of the required strength and having the desired tooth characteristics, in a process which requires no approximation and in which accuracy is a basic feature.

Where gears constructed according to this invention are proportioned according to the method described in my above mentioned copending application, the pinion will be larger and stronger than in a corresponding pair of bevel gears, with the consequence that greater reductions may be had than in bevel gears without decreased pinion strength, or that the size of the ring gear, in an automobile rear axle drive, may be reduced without diminishing the strength or size of the pinion as compared with pinions of corresponding ratios in bevel gears. This feature of course has its advantage in saving in gear costs in automobiles and permits a further lowering of the center of gravity of a motor vehicle on which the new drive is employed.

Gears of the kind I have devised can best be produced by moving a spherically profiled tool across the face of a stationary gear blank to produce one member of a pair and by moving a correspondingly profiled tool across the face of a gear blank while imparting a relative generating motion between the tool and blank in the manner of a gear meshing with the first gear with its axis non-intersecting and non-parallel to the axis of the first gear to produce the mate gear with teeth conjugate to those of the first gear. One member of this pair accordingly will be non-generated and the other member will be generated. This method of production not only insures the manufacture of gears which have the requisite tooth contact, but enables the manufacture of a pair of such gears more cheaply than a corresponding pair of generated bevel gears, and this, because one member of the pair can be produced without a rolling or generating motion, whereby a considerable saving in manufacturing time may be achieved.

Figure 5:
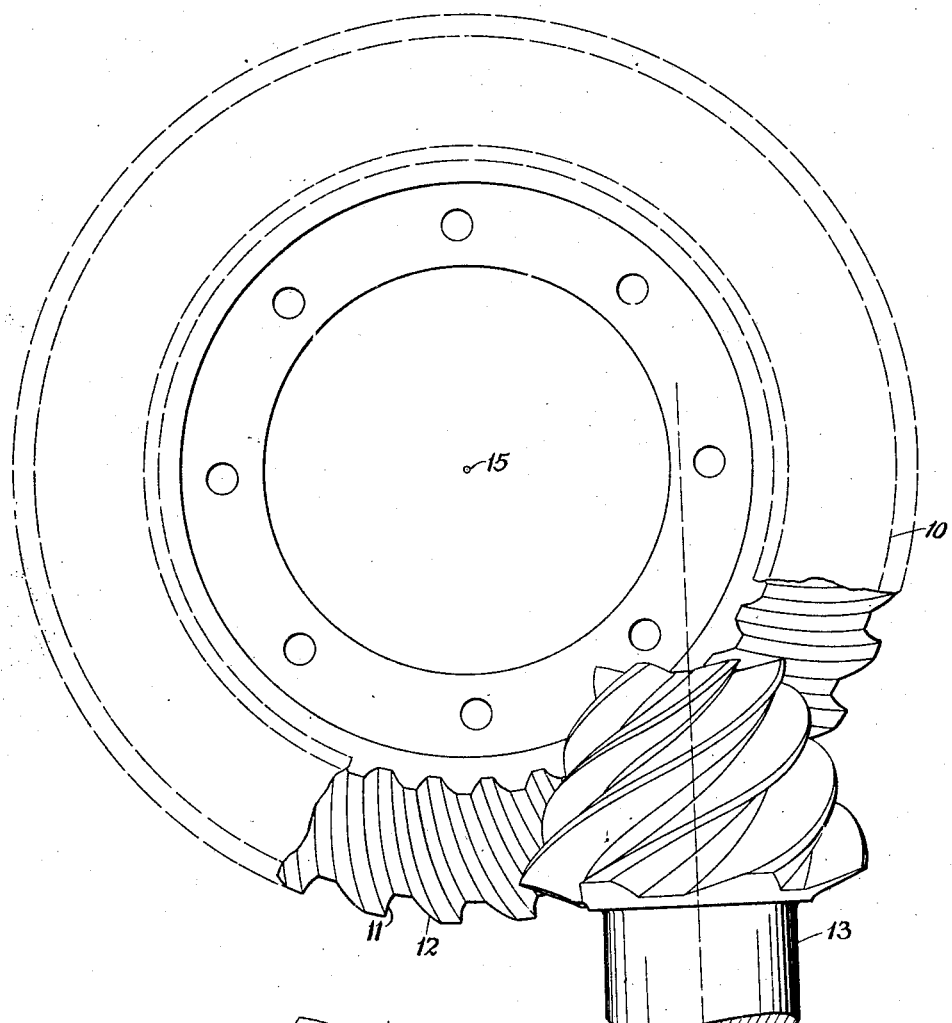
Fig. 5 is a plan view of a pair of gears constructed according to this invention.
Figure 6:
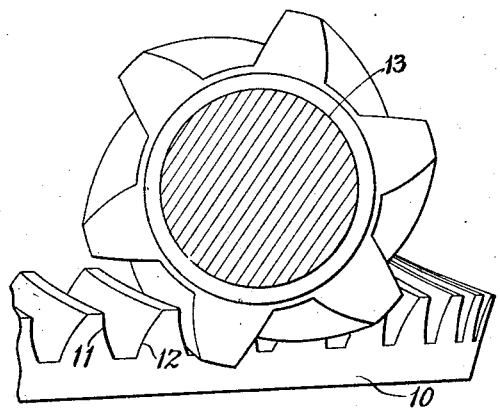
Fig. 6 is a fragmentary side elevation of the gears shown in Fig. 5.

Referring to Figs. 5 and 6, where a pair of gears produced according to one embodiment of this invention is shown, it will be seen that the gear or wheel 10 is provided with longitudinally curved teeth which are of spherical profile and of constant or uniform curvature throughout their length. The adjacent tooth faces 11 and 12 of this gear are of concave and convex spherical profile respectively. Adjacent tooth surfaces may be curved about the same center or about different centers as desired. The pinion 13 is arranged and so meshes with the gear that its axis 14 is offset from, that is, non-intersecting and non-parallel with respect to the axis 15 of the gear. The tooth surfaces of the pinion are generated and conjugate to the contacting tooth surfaces of the gear. While it is possible to construct the pinion so that its adjacent tooth surfaces are curved longitudinally about the same center, it is more desirable that adjacent tooth surfaces of the pinion be curved longitudinally about different centers, for reasons of design and in order to insure the requisite tooth strength. The tooth surfaces of both gear and pinion will, preferably, be so constructed that all elements of the tooth surfaces of both members will converge substantially in their respective apexes.

One method of producing a pair of gears according to this invention is illustrated diagrammatically in Figs. 1 to 4 inclusive. In producing the tooth surface of the gear, a tool having a spherical cutting profile is employed. This tool is moved in a curved path across the face of the gear blank which is held stationary on its axis. For the purpose of cutting this gear, preferably, a rotary face milling cutter such as indicated at 16 in Fig. 1 will be employed. This cutter will have a spherical cutting portion which may comprise a plurality of cutting blades or a complete annular grinding or other tooth finishing surface. As previously stated, adjacent tooth surfaces of the gear may be so cut as to be curved longitudinally about the same center or about different centers. Preferably, the adjacent tooth surfaces of the gear will be cut simultaneously in pairs curved longitudinally about the same center. For this purpose the tool 16 will be provided with convex and concave finishing blades. In either case after the completion of one cutting cycle, the blank will be indexed to present a new tooth surface or surfaces for cutting. The sphere centers 17 and 18 of the convex and concave cutting edges, 19 and 20 respectively, will, preferably, be located on the axis 21 of the tool. Preferably also, the radius of curvature of the respective cutting edges 19 and 20 will be equal. In this preferred method of cutting, the cutting edges 19 and 20 may be formed on the same blade or on two separate blades, adjustable relative to each other. The tool will be positioned relative to the blank to cut the gear with the required spiral angle and the tool axis 21 will preferably be inclined relative to the blank axis 22, to cut the gear with tapering depth. The relative settings of tool and blank will, preferably, be such as to produce a gear, all the elements of whose tooth surface intersect substantially at its apex.

In cutting the pinion a tool 23, having spherical cutting blades arranged annularly about its axis, similar to the tool 16, will be employed. The structure of the pinion cutter will be such that its cutting edges 24 will have the same radius of curvature as the cutting edges 19 of the tool 16 which are employed to cut a contacting tooth surface of the gear. This is indicated in Fig. 2 where it will be seen that the cutting edge 24 of the pinion tool 23 is curved about the sphere center 17 with the same radius of curvature as the cutting edge 19 of the gear tool 16. In like manner the cutting edges of the pinion tool which are employed to produce tooth surfaces of the pinion contacting with the tooth surfaces of the gear produced by the cutting edges 20 will have a radius of curvature equal to the radius of such cutting edges 20. The cutting edges of the tool 23 might be so arranged that this tool would cut simultaneously from the same center two adjacent tooth surfaces of the pinion blank, but I have found it preferable, for the sake of design and the strength of the pinion teeth, to cut adjacent tooth surfaces of the pinion from different centers. This means that the tool 22 and the pinion blank 25 will be reset relatively to each other after one side has been cut on all the teeth for cutting the adjacent side surface of the teeth.

To secure tooth surfaces on the pinion which will properly match those produced on the gear, a combined rolling and cutting motion is imparted between the tool and blank. During the cutting motion of the tool, the pinion blank and tool will be rolled relatively to each other in the manner of a gear meshing with its mate gear with its axis non-intersecting and non-parallel to the axis of the mate gear. This method of cutting is illustrated diagrammatically in Figs. 3, and 4, where the pinion blank 25 is shown supported on an adjustable head 26, which is adapted to be adjusted relative to the center line 27 of the machine, which represents the axis 22 of the mate gear, to offset the pinion axis 28 from the axis 27 of the mate gear, an amount corresponding to the offset of the two axes when the two gears are in meshing relation. In cutting the pinion the tool 24 is rotated on its axis 29 to move the spherical cutting edge or edges in a curved path across the face of the blank and simultaneously the tool and blank are rolled relatively to each other, while the blank axis 28 is maintained in fixed offset relation to the axis 27 of the mate gear. The rolling motion may be produced in any desired manner. As shown, the blank is rotated on its axis and is simultaneously translated about the axis 27 of the mate gear, the blank head 26 being mounted upon a cradle or carrier 30 driven for this purpose by a worm wheel 31.

The pinion blank, like the gear blank, will preferably have teeth, all elements of whose tooth surfaces intersect in its apex.

While in cutting gear and pinion, tools will be employed whose cutting edges are of spherical profile, it will be understood that if desired, a slight departure from a truly spherical cutting surface is permissible where the same is desirable for the purpose of securing a particularly localized bearing. The tools employed may be of any desired character, as grinding, lapping, etc. Instead of a rotary tool a single reciprocating tool or any other tool having the desired cutting profile may be employed, and instead of two separate tools such as indicated, the same tool may be employed to cut both gear and pinion, as described more particularly in my copending application, Serial No. 77,309, filed December 23, 1925.

In general, it may be said, that, while I have illustrated one preferred embodiment of my invention, the invention is capable of further modification within its limits and the scope of the appended claims, and that this application is intended to cover any variations, uses, or adaptations of my invention, following, in general, the principles of the invention and including such departures from the present disclosure as come within known or customary practice in gear cutting and may be applied to the essential features hereinbefore set forth and as fall within the scope of the appended claims.

Having thus described my invention, what I claim is:

1. A pair of gears provided with longitudinally curved teeth and arranged with axes non-intersecting and non-parallel, one of said gears being provided with tooth surfaces which are of spherical profile.

2. A pair of gears provided with longitudinally curved teeth and arranged with axes non-intersecting and non-parallel, one of said gears being provided with tooth surfaces which throughout their length are of uniformly curved profile.

3. A pair of gears arranged with axes non-intersecting and non-parallel and each provided with longitudinally curved teeth, one member of which has its adjacent tooth surfaces arranged in pairs, which are of spherical profile and coaxial surfaces of revolution, and the other member which is provided with generated tooth surfaces conjugate to those of the first member.

4. A pair of gears arranged with axes non-intersecting and non-parallel and each provided with longitudinally curved teeth, one member of which has its adjacent tooth surfaces arranged in pairs, which are of spherical profile and coaxial surfaces of revolution, and the other member of which is provided with generated tooth surfaces conjugate to those of the first member, and arranged in pairs curved longitudinally about different centers.

5. A pair of gears arranged with axes non-intersecting and non-parallel consisting of a gear having teeth whose side faces are of spherical curvature along the whole of their length, and a pinion having generated tooth surfaces conjugate to those of the first gear.

6. A pair of gears arranged with axes non-intersecting and non-parallel and each provided with longitudinally curved teeth, consisting of a gear having teeth whose side surfaces are of spherical profile along the whole of their length, and a pinion having generated tooth surfaces conjugate to those of the gear.

7. A pair of gears arranged with axes non-intersecting and non-parallel and each provided with longitudinally curved teeth, consisting of a gear whose adjacent tooth surfaces are of uniform convex and concave profile respectively, throughout their length, and a pinion whose adjacent tooth surfaces are generated and conjugate to those of the gear.

8. A pair of gears arranged with axes non-intersecting and non-parallel and each provided with longitudinally curved teeth, consisting of a gear whose tooth surfaces are arranged in pairs which are of uniform convex and concave spherical profile respectively, throughout their entire length, and a pinion whose tooth surfaces are generated and conjugate to those of the gear.

9. A pair of gears arranged with axes non-intersecting and non-parallel and each provided with longitudinally curved teeth, consisting of a gear whose adjacent tooth surfaces are arranged in pairs which are curved longitudinally about the same center and are of uniform convex and concave profile respectively, throughout their length, and a pinion provided with tooth surfaces generated conjugate to those of the gear and arranged in pairs curved longitudinally about different centers.

10. A pair of gears arranged with axes non-intersecting and non-parallel and each provided with longitudinally curved teeth, consisting of a gear whose adjacent tooth surfaces are arranged in pairs which are curved longitudinally about the same center and are of uniform convex and concave spherical profile respectively, throughout their length and a pinion provided with tooth surfaces generated conjugate to those of the gear and arranged in pairs curved longitudinally about different centers.

11. A pair of gears provided with longitudinally curved teeth and arranged with axes non-intersecting and non-parallel one of said gears having tooth surfaces such as might be formed by moving a spherical cutting tool in a curved path across the face of a stationary gear blank, and the other of said gears having tooth surfaces such as might be produced by moving a spherical cutting tool in a curved path across the face of a gear blank while imparting a relative rolling motion between tool and blank in manner of a gear meshing with the first gear with its axis non-intersecting and non-parallel to the axis of the first gear.

12. A generated hypoid gear provided with longitudinally curved teeth whose side surfaces are conjugate to the spherical side surfaces of a mating gear.

13. A gear having tooth surfaces such as might be produced by moving a tool whose profile is of spherical curvature across the face of gear blank while rotating tool and blank together in manner of gear meshing with a mating gear with its axis non-intersecting and non-parallel to the axis of mating gear.

14. A pair of gears arranged with axes non-intersecting and non-parallel and each provided with longitudinally curved teeth, consisting of a gear whose adjacent tooth surfaces are of uniform convex and concave profile respectively, throughout their length, and a pinion whose adjacent tooth surfaces are generated and conjugate to those of the gear, each of said members being tapered and having all elements of their tooth surfaces intersecting in a common apex.

15. A generated hypoid gear provided with longitudinally curved teeth whose side surfaces are conjugate to spherical surfaces of revolution.

16. A gear having tooth surfaces such as might be produced by moving a tool whose profile is of spherical curvature across the face of a tapered gear blank, while rotating the blank on its axis and simultaneously imparting an additional relative movement between the tool and blank about an axis offset from the blank axis.

17. A pair of hypoid gears having longitudinally curved teeth, one of which has side tooth surfaces conjugate to spherical surfaces of revolution, the spiral angles of the teeth of said gear being larger than the spiral angle of the teeth of the mate gear, said first gear being the smaller member of the pair.

ERNEST WILDHABER.